UNITED STATES PATENT OFFICE.

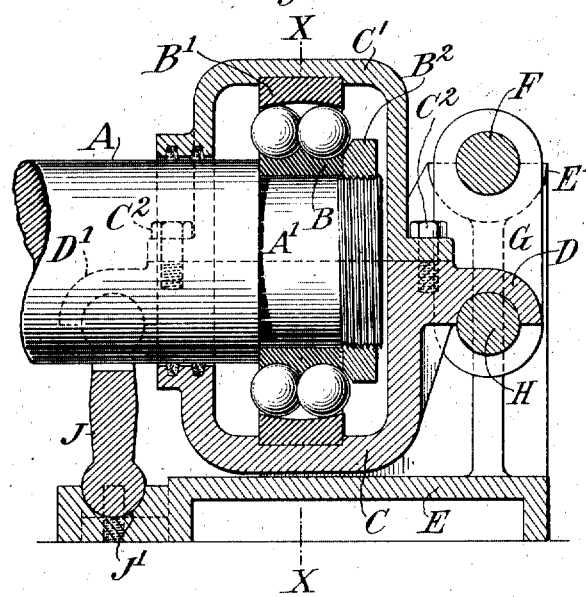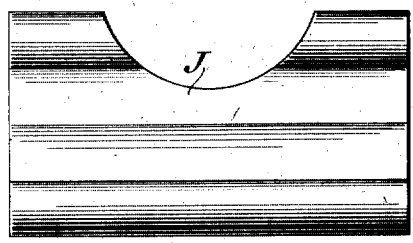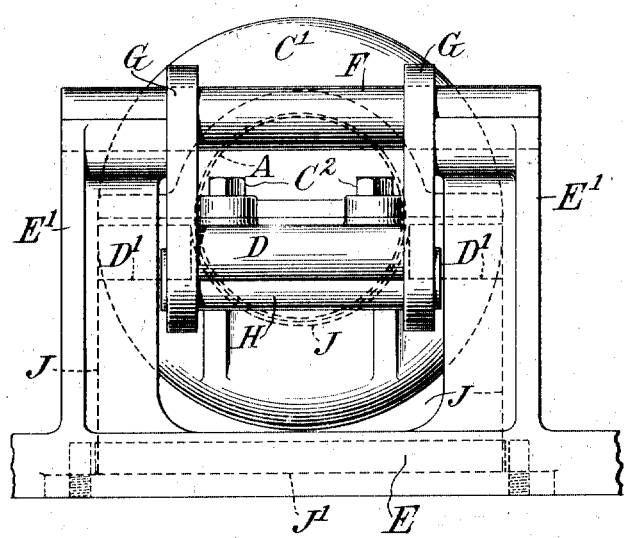

HENRY JAMES MOYSEY, OF GATESHEAD, ENGLAND, ASSIGNOR TO AKTIEBOLAGET SVENSKA KULLAGERFABRIKEN, OF GOTTENBORG, SWEDEN, A CORPORATION OF SWEDEN.

ROLLER-BEARING.

1,250,620.　　　　Specification of Letters Patent.　　Patented Dec. 18, 1917.

Application filed December 22, 1916. Serial No. 138,490.

*To all whom it may concern:*

Be it known that I, HENRY JAMES MOYSEY, a subject of the King of England, residing at Gateshead, in the county of Durham, England, but at present in Shanghai, China, have invented certain new and useful Improvements in Roller-Bearings, of which the following is a specification, reference being had to the drawings accompanying and forming a part thereof.

This invention consists of improvements in or relating to supporting ball or roller radial bearings and the like and has for its object to provide such a construction as will allow free axial movement of the bearing within the limits required without the bearing having to exert excessive axial thrust even though the speed of rotation be slow and the radial load on the bearing be the maximum allowable.

When a shaft is fitted with ball-bearings it is important that only one bearing should be fixed against lateral movement, since if two or more on the same shaft are fixed, the variation in length of the shaft at different temperatures would set up a severe axial load on some of the bearings and quickly destroy them. Heretofore it has been customary to leave the outer race ring free to move laterally in its housing, but under a heavy radial load the thrust required to move the bearing in its housing may be very great, unless the housing is perfect.

The preferred commercial form of the present invention in the illustrative example shown in the drawings comprises a ball bearing for radial loads and a housing in which the outer race ring is fixed and which housing is itself free to move longitudinally of the axis of the bearing to take up endwise movement without straining the bearing or moving the outer race relatively to the housing.

Preferably the housing is supported on swinging links in the manner hereinafter described and illustrated in the accompanying drawings, in which Figure 1 is a central longitudinal section:

Fig. 2 is an end view looking from the right-hand end in Fig. 1, and

Fig. 3 is a detail.

The shaft which is to be supported is indicated at A, and is formed at its end with a reduced portion $A^1$ whereon the ball or roller-bearing is fitted. The bearing is preferably of the self-alining type in which the inner ring B is formed with two races and the outer ring $B^1$ is provided with a spherical surface whose center is on the center line at the middle of the ring of the bearing. The inner ring of the bearing is maintained in position on the shaft by a nut $B^2$ in the usual manner.

The outer ring $B^1$ is secured in a housing consisting of a lower part C and a cap or cover $C^1$ which is secured in place by bolts or studs $C^2$ in any convenient manner. The race $B^1$ is let into a recess in the housing $C C^1$ so that it is fixed and cannot move relatively to the housing. On the part C on the housing are formed lugs D $D^1$ at each end, the lug D preferably extending across the middle of the housing, and the lugs $D^1$ being situated one at each side as indicated in Fig. 2.

The whole housing is supported on a baseplate E which is provided at the right-hand side in Fig. 1 with upstanding brackets $E^1$ at each side. Bridging the space between these two brackets is a pivot pin F which is let into suitable bearings in the brackets and from this pin F there are suspended two links G. The lower ends of these links are connected by a pin H which lies under the lug D engaging a suitable formed bearing-surface which provides a support for that end of the housing $C C^1$.

At the other end of the housing there is provided a strut-member J formed with cylindrical upper and lower ends and it engages the lugs $D^1$ on the underside so as to constitute a support for that end of the housing. This member is seated in suitable half-cylindrical bearing on the base E, and the middle of its upper edge is cut away as shown in Fig. 3 to accommodate the shaft A. Obviously, two separate struts J could be used instead, one at each side of the housing.

It will be seen that with this construction the housing is free to move longitudinally of the axis of the bearing owing to the freedom of the links G and strut J to swing in a plane parallel to the vertical plane which contains the longitudinal axis of the bearing $B B^1$. The parts are preferably so designed that the links G and strut J are all of the same length and in their normal position are all parallel and vertical. It is also desirable that they should be equi-distant from the central plane of the bearing indicated at X X. This arrangement insures that the vertical height of the bearing and shaft will not be altered for small axial movements of the shaft or in other words the suspension constitutes a "straight line" linkage, within certain limits of movement. When axial movement of the housing and bearing takes place there will be a slight tilting from the vertical plane of the housing C C¹ and of the outer race ring B¹, but this will be no more than can easily be accommodated by the spherical construction of the outer race.

It will be appreciated that since the vertical height of the center line of the bearing remains constant, axial displacement of the bearing can take place without the necessity of any great thrust being exercised, or in other words the housing will yield readily in an axial direction with comparatively small thrusts.

It will be appreciated that various modifications may be made in the construction of a housing according to this invention. Thus, for example, the precise construction of the links and their connection with the housing and bracket can be changed to a very great degree without departing from the spirit of the present invention. The construction hereinbefore described and illustrated, however, is preferred, for it offers several advantages; some of these have already been described and to them may be added the important fact that when the housing is displaced axially of the bearing, there is no end thrust to be sustained by the bearing for the axial forces on the whole structure balance one another since the horizontal component of the tension in the link G is equal and opposite to the horizontal component of the compression in the strut J.

I claim as my invention:—

1. The combination with a roller bearing for radial loads, of a straight-line linkage supporting one of the race-carrying members of the said bearing.

2. The combination with a roller bearing for radial loads, of a housing carrying the outer ring of such bearing and swinging links supporting the housing and so arranged that the links and housing together constitute a straight-line linkage.

3. The combination with a roller bearing for radial loads, of a straight-line linkage supporting one of the race-carrying members of the said bearing, one member of said linkage comprising a member extending in the general direction of the axis of rotation of the bearing, the member of the linkage at one end comprising a tension link, and the member at the other end comprising a compression link.

4. The combination with a roller bearing for radial loads, of a housing carrying the outer race of such bearing, and having supporting faces at opposite sides of said bearing, tension links engaging one of said faces, and a strut engaging the other face, said links and strut being all of the same length, normally parallel one to the other, and connected to the housing at points equidistant from the center plane of the bearing.

5. The combination with a roller bearing for radial loads, of a housing in which the outer race is fixed, and swinging links supporting the housing and so arranged that the links and housing together constitute a Watts straight-line linkage.

6. The combination with a self-alining roller bearing for radial loads, of a housing carrying the outer race of such bearing, and swinging links supporting the housing and so arranged that the center of oscillation of the bearing is caused to move in a straight line.

In testimony whereof I affix my signature.

HENRY JAMES MOYSEY.